United States Patent
Lee

(10) Patent No.: US 11,876,266 B2
(45) Date of Patent: Jan. 16, 2024

(54) MANUFACTURING METHOD OF FUEL CELL CONTROLLING POSITION OF ANTIOXIDANT

(71) Applicants: Hyundai Motor Company, Seoul (KR); Kia Corporation, Seoul (KR)

(72) Inventor: Ju Hee Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/381,651

(22) Filed: Jul. 21, 2021

(65) Prior Publication Data

US 2022/0200031 A1    Jun. 23, 2022

(30) Foreign Application Priority Data

Dec. 17, 2020 (KR) .................. 10-2020-0177210

(51) Int. Cl.
   *H01M 8/1004*    (2016.01)
   *H01M 8/1007*    (2016.01)
   *H01M 8/0276*    (2016.01)

(52) U.S. Cl.
   CPC ....... *H01M 8/1004* (2013.01); *H01M 8/0276* (2013.01); *H01M 8/1007* (2016.02)

(58) Field of Classification Search
   CPC .......... H01M 8/1004; H01M 8/0276; H01M 8/1007; H01M 8/0245; H01M 8/0286; H01M 8/1051; H01M 8/1086
   See application file for complete search history.

(56) References Cited

U.S. PATENT DOCUMENTS

| | | | | |
|---|---|---|---|---|
| 2019/0207226 A1* | 7/2019 | Yun | ........... | H01M 4/8605 |
| 2019/0245231 A1* | 8/2019 | Sousa | ........... | H01M 8/0286 |
| 2020/0212457 A1* | 7/2020 | Ko | ........... | H01M 8/0286 |
| 2020/0313213 A1* | 10/2020 | Park | ........... | H01M 8/1007 |
| 2021/0151777 A1* | 5/2021 | Woo | ........... | H01M 4/8896 |

FOREIGN PATENT DOCUMENTS

| | | |
|---|---|---|
| JP | 2011-508953 A | 3/2011 |
| KR | 100970358 B1 | 7/2010 |
| KR | 100971640 B1 | 7/2010 |
| KR | 2019-0080049 A | 7/2019 |

OTHER PUBLICATIONS

Franziska Schwabe et al., J. Nanopart. Res., 16, 2668-2676 (2014).
D. Horlait, et al., Inorg. Chem. 51, 3868?3878 (2012).

* cited by examiner

*Primary Examiner* — Stewart A Fraser
(74) *Attorney, Agent, or Firm* — Fox Rothschild LLP

(57) ABSTRACT

Disclosed herein are a method of manufacturing a fuel cell, and a fuel cell manufactured according to the method. The method includes bonding a sub-gasket, provided with an air inlet and a hydrogen inlet, to a side surface of a three-layer membrane-electrode assembly (MEA) including an electrolyte membrane, a cathode located on one surface of the electrolyte membrane, and an anode located on the other surface of the electrolyte membrane; stacking a gas diffusion layer, which comprises an antioxidant precursor, on at least one of the cathode and the anode and preparing a five-layer MEA; and applying a current to the five-layer MEA and moving an antioxidant, which is derived from the antioxidant precursor, to the electrolyte membrane.

10 Claims, 11 Drawing Sheets

MANUFACTURING METHOD OF FUEL CELL CONTROLLING POSITION OF ANTIOXIDANT

CROSS-REFERENCE TO RELATED APPLICATION

This application claims under 35 U.S.C. § 119(a) the benefit of priority to Korean Patent Application No. 10-2020-0177210 filed on Dec. 17, 2020, the entire contents of which are incorporated herein by reference.

TECHNICAL FIELD

The present invention relates to a method of manufacturing a fuel cell, which locally moves metal ions contained in an antioxidant to a region of an electrolyte membrane having a lot of chemical degradation, and a fuel cell manufactured according to the method.

BACKGROUND

Generally, polymer electrolyte membrane fuel cells (PEMFCs) are applied as fuel cells for vehicles. In order for the PEMFCs to exhibit normally high output performance of at least several tens of kW in various driving conditions of vehicles, the PEMFCs should be able to operate stably in a wide current density range.

A reaction for generating electricity in the PEMFC occurs in a membrane-electrode assembly (MEA) formed of a perfluorinated sulfonic acid ionomer-based membrane and electrodes of an anode and a cathode. Hydrogen supplied to the anode which is an oxide electrode of the PEMFC is separated into hydrogen ions (protons) and electrons, and then the hydrogen ions move toward the cathode, which is a reduction electrode, through a membrane and the electrons move to the cathode through an external circuit. Thereafter, oxygen molecules, the hydrogen ions, and the electrons react together at the cathode to generate electricity and heat, and simultaneously, water ($H_2O$) is generated as a reaction by-product.

When an appropriate amount of water is present, the water generated during the electrochemical reaction in the PEMFC desirably serves to maintain humidification of the MEA. However, when the water is excessively present, a flooding phenomenon occurs at a high current density. The flooding water hinders an efficient supply of reaction gases to an interior of the PEMFC so that a voltage loss becomes very large. In the electrochemical reaction of such a PEMFC, when the hydrogen ions at the anode move to the cathode through a membrane, the hydrogen ions are generally combined with water molecules in the form of hydronium ions such as $H_3O^+$ to drag the water molecules. This phenomenon is referred to as an electro-osmotic drag (EOD). In addition, when an amount of water accumulated at the cathode is increased, some water may move in reverse from the cathode to the anode, and this is referred to as back diffusion (BD). Thus, in order to obtain excellent cell performance from the PEMFC, it is necessary to accurately understand a movement phenomenon of water and to efficiently use water in the PEMFC.

In general, hydrogen and oxygen in the air, which are reaction gases of the PEMFC, crossover through an electrolyte membrane to promote generation of hydrogen peroxide (H—O—O—H), and the hydrogen peroxide generates a hydroxyl radical (—OH) and oxygen-containing radicals such as a hydroperoxyl radical (—OOH). The radicals attack a perfluorinated sulfonic acid-based electrolyte membrane to cause chemical degradation of the electrolyte membrane, thereby reducing durability of the PEMFC. Conventionally, as a technique for mitigating the chemical degradation of the electrolyte membrane, a method of adding various kinds of antioxidants to the electrolyte membrane has been proposed. In addition, as a guaranteed capability time of the MEA is increasing, research is being carried out in a direction of increasing capability of an antioxidant or increasing an absolute amount thereof.

However, the direction of increasing the capability of the antioxidant requires a lot of research time and investment due to a technical limitation. Thus, in the industry, most of the research has been performed in the direction of increasing the absolute amount of the antioxidant in the electrolyte membrane. However, when only the absolute amount of the antioxidant is increased, metal ions representing anti-oxidizing enter in the electrolyte membrane with a predetermined amount or more to chelate with a sulfonic group 3ea representing proton conducting. Therefore, there is a problem in that conductivity is degraded and thus an ohmic loss is increased. In addition, when only the absolute amount of the antioxidant is increased, there is a problem in that, when a process of transferring cathode/anode electrodes is performed, transferability is degraded due to a change in surface characteristic so that an occurrence rate of a defect may be rapidly increased.

Therefore, there is a need for an efficient and economical method of manufacturing a fuel cell by introducing an antioxidant at a high concentration into only the electrolyte membrane in which degradation occurs frequently.

SUMMARY

In preferred aspects, provided are a method of manufacturing a fuel cell, which locally moves metal ions, contained in an antioxidant, to a region of an electrolyte membrane having a lot of chemical degradation, and a fuel cell manufactured by the method.

Objectives of the present invention are not limited to the above-described objectives, and other objectives of the present invention, which are not mentioned, can be understood by the following description and also will be apparently understood through embodiments of the present invention. Further, the objectives of the present invention can be implemented by means described in the appended claims and a combination thereof.

In an aspect, provided is a method of manufacturing a fuel cell, which may include bonding a sub-gasket, provided with an air inlet and a hydrogen inlet, to a side surface of a three-layer membrane-electrode assembly (MEA) including an electrolyte membrane, a cathode located on one surface of the electrolyte membrane, and an anode located on the other surface of the electrolyte membrane; stacking a gas diffusion layer, which contains an antioxidant precursor, on at least one of the cathode and the anode and preparing a five-layer MEA; and applying a current to the five-layer MEA and moving an antioxidant, which is derived from the antioxidant precursor, to the electrolyte membrane.

The gas diffusion layer may include a base material and a microporous layer located on the base material, the microporous layer may be located on at least one of the cathode and the anode, and the antioxidant precursor may be contained in the microporous layer.

The "microporous layer" as used herein refers to a porous material that includes pores or holes having a size less than 2 nm. Exemplary microporous substrate may include closed or open pores within a predetermined size (e.g., less than 2 nm), which is measured by maximum diameter of the pores.

The antioxidant precursor may include an oxide of the antioxidant.

The antioxidant precursor may include at least one of $CeO_2$ and $MgO_2$.

The antioxidant may be in an ionic state.

The antioxidant may include one or more selected from the group consisting of $Ce^{3+}$, $Ce^{4+}$, $Mg^{2+}$, and $Mg^{3+}$.

The microporous layer may include the antioxidant precursor in a content ranging from about 165 μg/cm² to about 210 μg/cm².

A thickness of the microporous layer may range from about 10 μm to about 100 μm.

The current may be applied to the gas diffusion layer with an intensity ranging from about 50 A to about 250 A.

The current may be applied to the gas diffusion layer in a condition in which a temperature may range from about 30° C. to about 90° C., humidity may range from about 30% to about 100%, and a time for applying the current may be about three hours or greater.

Method described herein, and the antioxidant derived from the antioxidant precursor contained in the gas diffusion layer may be included in the electrolyte membrane.

The antioxidant may be mainly distributed in a portion corresponding to the gas diffusion layer adjacent to an air inlet of a sub-gasket in the electrolyte membrane in a thickness direction.

The antioxidant may be contained in the electrolyte membrane in a content ranging from about 0.1 μm/cm² to about 20 μm/cm².

Other aspects of the present invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
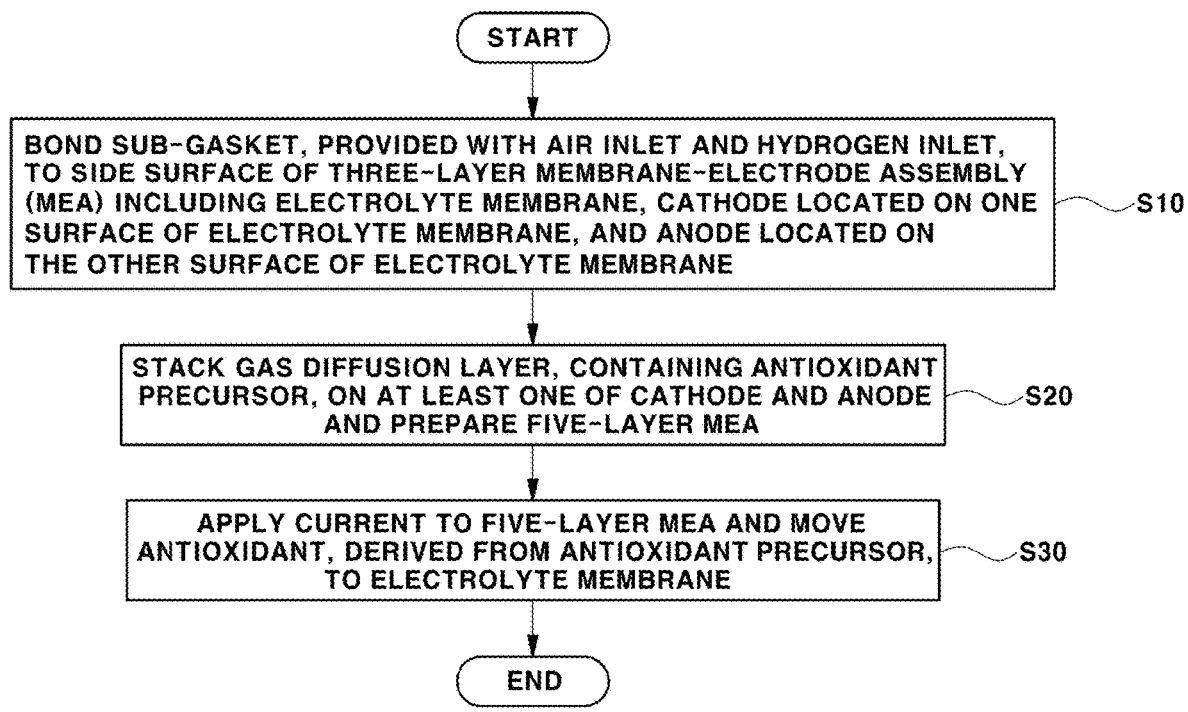
FIG. 1 shows an exemplary method of manufacturing a fuel cell according to an exemplary embodiment of the present invention.

It should be understood that the appended drawings are not necessarily to scale, presenting a somewhat simplified representation of various preferred features illustrative of the basic principles of the present invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The above and other objectives, features, and advantages of the present invention will become more apparent from the following description of preferred embodiments with reference to the accompanying drawings. However, the present invention is not limited to the embodiments disclosed herein and may be implemented in other forms. The embodiments disclosed herein will be provided to make this invention thorough and complete, and will fully convey the spirit of the present invention to those skilled in the art.

In describing each drawing, similar reference numerals are assigned similar components. In the accompanying drawings, dimensions of structures are shown in an enlarged scale for clarity of the present invention. Although the terms "first," "second," and the like may be used herein to describe various components, these components should not be limited to these terms. The terms are used only for the purpose of distinguishing one component from another component. For example, without departing from the scope of the present invention, a first component may be referred to as a second component, and similarly, a second component may also be referred to as a first component. Unless the context clearly dictates otherwise, the singular form includes the plural form.

It should be understood that the terms "comprise," "include," and "have" specify the presence of stated herein features, numbers, steps, operations, components, elements, or combinations thereof, but do not preclude the presence or possibility of adding one or more other features, numbers, steps, operations, components, elements, or combinations thereof. Further, when a portion of a layer, a film, a region, a plate, or the like is referred to as being "on" other portion, this includes not only a case in which the portion is "directly on" the other portion but also a case in which another portion is present between the portion and the other portion. Contrarily, when a portion of a layer, a film, a region, a plate, or the like is referred to as being "under" other portion, this includes not only a case in which the portion is "directly under" the other portion but also a case in which another portion is present between the portion and the other portion.

Unless otherwise specified, all numbers, values, and/or expressions indicating ingredients, reaction conditions, polymer compositions, and quantities of combination products used herein are approximations to which various uncertainties of measurement are reflected, wherein the various uncertainties occur in obtaining these values among essentially different other things so that it should be understood that all numbers, values, and/or expressions are modified by a term "about." Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed herein, such a numerical range is continuous and, unless otherwise indicated, the numerical range includes all values from a minimum value to a maximum value. Further, when the numerical range refers to integers, unless otherwise indicated, all integers from a minimum value to a maximum value are included.

In this invention, when a range is described for a variable, it will be understood that the variable includes all values within the range including endpoints described in the range. For example, it will be understood that a range from "5 to 10" includes values of 5, 6, 7, 8, 9, and 10 as well as any subranges such as ranges from 6 to 10, from 7 to 10, from 6 to 9, from 7 to 9, and the like, and also includes any values between integers, which are reasonable in the scope of ranges, such as 5.5, 6.5, 7.5, 5.5 to 8.5, and 6.5 to 9, and the like. In addition, for example, it will be understood that a range from "10% to 30%" includes all integers including values 10%, 11%, 12%, 13%, and the like and up to 30% as well as subranges from 10% to 15%, from 12% to 18, from 20% to 30%, and the like, and also includes any values between integers, which are reasonable in the scope of ranges, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Method of Manufacturing a Fuel Cell

FIG. 1 is a schematic flowchart illustrating a method of manufacturing a fuel cell according to one embodiment of the present invention. As shown in FIG. 1, the method of manufacturing a fuel cell may include bonding a sub-gasket, which is provided with an air inlet and a hydrogen inlet, to a side surface of a three-layer membrane-electrode assembly (MEA) including an electrolyte membrane, a cathode located on one surface of the electrolyte membrane, and an anode located on the other surface of the electrolyte membrane (S10); stacking a gas diffusion layer, which contains an antioxidant precursor, on the cathode and the anode and preparing a five-layer MEA (S20); and applying a current to the five-layer MEA and moving an antioxidant, derived from the antioxidant precursor, to the electrolyte membrane (S30).

The preparing of the three-layer MEA to which the sub-gasket is bonded (S10) includes a process of preparing the three-layer MEA including the cathode located on one surface of the electrolyte membrane and the anode located on the other surface of the electrolyte membrane and then bonding the sub-gasket, which is provided with the air inlet and the hydrogen inlet, to the side surface of the three-layer MEA.

The electrolyte membrane according to the present invention may be a conventional electrolyte membrane capable of being used in the present invention, for example, a perfluorinated sulfonic acid-based compound and a fluorine-based polymer compound having a sulfonic acid group at a terminal group. Preferably, the electrolyte membrane may be Nafion and a polytetrafluoroethylene (PTFE)-based polymer which is a polymer having MSC, LSC, and SSC-based side chains in a main chain of Teflon, but the electrolyte membrane is not limited to containing a specific component.

The cathode located on one surface of the electrolyte membrane is a conventional cathode capable of being used in the present invention, for example, transition metal series such as Pt/C, $PtM_xN_y/C$ (M or N=Ni), Co, and Fe, noble metal-based catalysts except Pd, and an ionomer polymer which is a PFSA-based polymer material serving as a catalyst and a binder in the electrode, but the cathode is not limited to containing a specific component.

The anode located on the other surface of the electrolyte membrane is a conventional cathode capable of being used in the present invention, for example, reverse voltage prevention catalysts such as Pt/C and $IrO_x$, and an ionomer polymer which is a PFSA-based polymer material serving as a catalyst and a binder in the electrode, but the anode is not limited to including a specific component.

The sub-gasket may be bonded to the side surface of the three-layer MEA. The sub-gasket according to the present invention is not particularly limited as long as it is capable of preventing the MEA of 20 micrometers or less from fluttering to increase work efficiency and is capable of preventing an edge-failure of the MEA. Preferably, the sub-gasket may be formed in an edge region of the side surface of the three-layer MEA to seal a side end portion of the three-layer MEA. A shape of the sub-gasket may be varied according to a general shape capable of being used in the present invention, for example, a shape of the five-layer MEA and may include one or more shapes of a rectangular shape, a square shape, an elliptical shape, a circular shape, and a combination thereof, but the shape of the sub-gasket is not limited to a specific shape.

The sub-gasket according to the present invention may be provided with the air inlet and the hydrogen inlet. Preferably, portions located adjacent to an air inlet and a hydrogen inlet of a separation plate, which is to be stacked, may be referred to as the air inlet and the hydrogen inlet of the sub-gasket.

The method of manufacturing a fuel cell according to the present invention has an advantage which is capable of selectively and intensively introducing an antioxidant into only "a portion corresponding to the gas diffusion layer adjacent to an air inlet of a sub-gasket, which is a position at which degradation occurs frequently in the electrolyte membrane, at a high concentration in a thickness direction" through a specific current application condition applied to the cell.

Figure 2A:
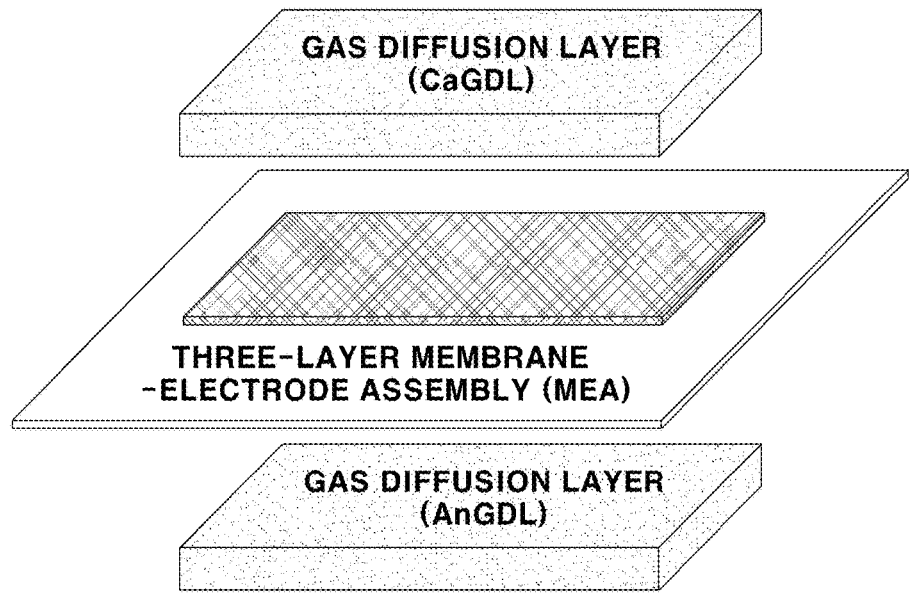
FIG. 2A shows an exemplary gas diffusion layer including an antioxidant precursor is provided to be in contact with each of a cathode and an anode according to an exemplary embodiment of the present invention.
Figure 2B:
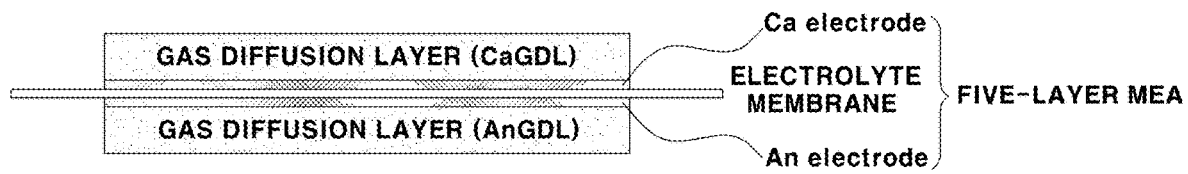
FIG. 2B shows an exemplary three-layer membrane-electrode assembly (MEA) after the gas diffusion layer including the antioxidant precursor is provided to be in contact with each of the cathode and the anode according to an exemplary embodiment of the present invention.

As shown in FIGS. 2A and 2B, the preparing of the five-layer MEA (S20) includes a process of stacking the gas diffusion layer, which contains the antioxidant precursor, on at least one of the cathode and the anode and preparing the five-layer MEA (the sub-gasket is not shown).

Figure 3:
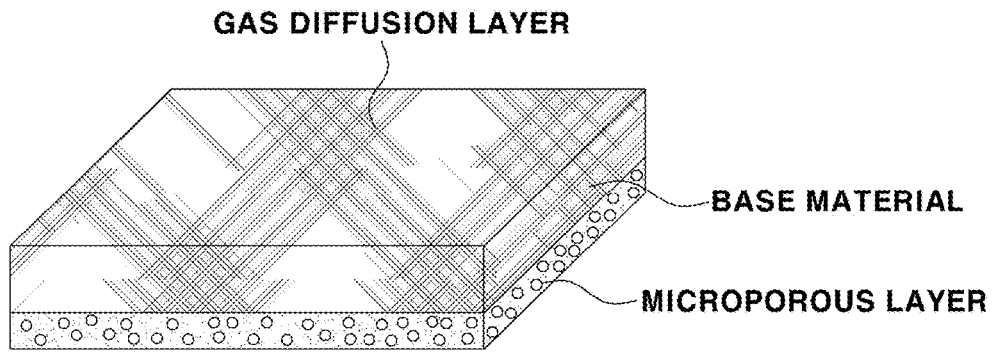
FIG. 3 shows an exemplary gas diffusion layer according to an exemplary embodiment of the present invention.

FIG. 3 is an enlarged perspective view illustrating the gas diffusion layer according to the present invention. As shown in FIG. 3, the gas diffusion layer according to the present invention may include a base material and a microporous layer located on the base material, and the microporous layer may be located on at least one of the cathode and the anode, and preferably, may be located on both the cathode and the anode. The microporous layer may include i) a polymer material one or more selected from the group consisting of polypropylene oxide, polystyrene, polyarylene ether, and polyimide, and ii) a carbon material including one or more PFSA-based polymer materials.

A thickness of the microporous layer may range from about 10 μm to about 100 μm. When the thickness of the microporous layer is less than about 10 μm, since a density of an antioxidant content in the microporous layer is too high, an aggregation phenomenon may occur so that there is a disadvantage in that a structure of the microporous layer may be destroyed due to a load applied when a unit cell is stacked. In contrast, when the thickness thereof is greater than about 100 μm, the density of the antioxidant content is too small, and thus there is a disadvantage in that, when a current is applied for a certain period of time, an appropriate dissolved amount of antioxidant ions is not eluted and a single cell-pitch is increased in a region having a specific thickness or more so that a volume is increased when the unit cell is stacked.

The microporous layer may include the antioxidant precursor. Preferably, the antioxidant precursor may include an oxide of the antioxidant, or particularly include one or more selected from the group consisting of $CeO_2$ and $MgO_2$. The microporous layer may include the antioxidant precursor in a content ranging from about 165 μg/cm$^2$ to about 210 μg/cm$^2$, and preferably, ranging from about 165 μg/cm$^2$ to about 190 μg/cm$^2$. When the content of the antioxidant precursor is less than about 165 μg/cm$^2$, there is a disadvantage in that a saturation amount of cerium ions is small and thus a durability improvement effect is insignificant, and when the content of the antioxidant precursor is greater than about 190 μg/cm$^2$, since the saturation amount of the cerium ions is present above a certain level, there is a disadvantage in terms of a production cost.

The method of manufacturing a fuel cell according to the present invention has an advantage which is capable of applying a current to the gas diffusion layer in a specific condition to put the antioxidant, derived from the antioxidant precursor, into the electrolyte membrane, preferably, a portion of the electrolyte membrane, which corresponds to the gas diffusion layer, adjacent to the air inlet of the sub-gasket, in the thickness direction.

The moving of the antioxidant to the electrolyte membrane (S30) includes a process of applying a current to the five-layer MEA in a specific condition and moving the antioxidant, which is derived from the antioxidant precursor, to the electrolyte membrane.

The current may be applied to the five-layer MEA. Preferably, the current may be applied after a unit cell in which separator plates are stacked on both surfaces of the five-layer MEA is formed or applied to a stack in which the unit cell is stacked. However, the current is not applied by limiting a specific type.

Thus, the method of manufacturing a fuel cell according to the present invention has an advantage in that a current may be applied to the five-layer MEA in a specific condition, and the high concentration of antioxidant derived from the antioxidant precursor may be selectively and intensively put into only "a portion of corresponding to the gas diffusion layer adjacent to the air inlet of the sub-gasket, which is a position in which degradation occurs frequently, at a high concentration in the thickness direction."

That is, since a reaction surface on which the electrolyte membrane, the cathode, and the anode of the five-layer MEA are in contact with each other is formed in a rectangular shape, when a current is applied under a specific condition, a position at which the antioxidant is distributed in the electrolyte membrane may be varied according to the above specific condition. In this case, when the current is applied to the five-layer MEA according to a current application condition of the present invention, the antioxidant may be selectively and intensively put into only "a portion corresponding to the gas diffusion layer adjacent to the air inlet of the sub-gasket, which is a position in which degradation occurs frequently, at a high concentration in the thickness direction."

Particularly, a current applied to the five-layer MEA may be applied with an intensity ranging from about 50 A to about 250 A, and preferably, ranging from about 100 A to about 200 A. When the current is applied with a low intensity, e.g., less than about 50A, there is a disadvantage in that, since an amount of water generated at an extremely low current is too small, a proper dissolution phenomenon of the target antioxidant (cerium) ions does not occur so that it is difficult to move an appropriate amount from the gas diffusion layer (GDL) to the MEA. In contrast, when the current is applied with a high intensity, e.g., greater than about 250 A, there is a disadvantage in that the electrode may be damaged due to the application of a high current for a long period of time relative to the amount of the generated water.

In addition, a current may be preferably applied in a condition in which a temperature may range from about 30° C. to about 90° C., humidity may range from about 30% to about 100%, and a time for applying the current may be about three hours or greater. In particular, the current may be applied in a condition in which a temperature may range from about 55° C. to about 65° C., humidity may range from about 50% to about 100%, and a time for applying the current may range from about three hours to about 800 hours.

When the temperature is less than the above range, e.g., less than about 30° C., a moving speed of metal ions, which are antioxidants generated after the antioxidant precursor is dissolved, is too slow so that there is a disadvantage in that a constant current holding time is increased and thus efficiency is decreased. When the temperature is greater than the above range, e.g., greater than about 90° C., the temperature of the MEA rises rapidly, there is a probability of acceleration of degradation in material, a size growth and aggregation of metal nanoparticles in the material. In addition, when the humidity is less than the above range, e.g., less than about 30%, mobility of metal ions which is antioxidants may be decreased in a dry environment in which the MEA is not sufficiently wet, there is a probability in that chemical degradation may be accelerated, and the humidity cannot exceed 100% as the highest humidity. In addition, when the current holding time is less than the above range, e.g., less than about three hours, there is a disadvantage in that sufficient movement and a movement deviation of in a plane direction are not exhibited. When the current holding time is too long, after the current holding time is greater than the above range, e.g., greater than about 800 hours, a saturation stage in which the amount of antioxidant moving to the electrolyte membrane is not increased to a certain level (10 µg/cm$^2$) or more is present so that there is a disadvantage in that operating efficiency and economic feasibility are degraded.

According to the various exemplary embodiments of the present invention, particularly due to the method including moving the antioxidant that is derived from the antioxidant precursor to the electrolyte membrane, there is an advantage in that there is no need for an additional operation in the manufacturing operation so as to control a position of the antioxidant so that efficiency of the process may be improved, and in that the antioxidant may be electively and intensively put into only a position at which degradation occurs frequently in the electrolyte membrane at a high concentration so that there is an advantage in that economic feasibility is excellent. In addition, since position control is possible in an ionic state instead of an oxide type, a radical scavenger is possible so that there is an advantage in that efficiency of oxidation prevention is high.

Fuel Cell

A fuel cell may be manufactured according to the methods described herein. As such, the antioxidant derived from the antioxidant precursor contained in the gas diffusion layer may be included in the electrolyte membrane. Preferably, the antioxidant may be mainly distributed in "a portion corresponding to the gas diffusion layer adjacent to the air inlet of the sub-gasket, which is a position in which degradation occurs frequently in the electrolyte membrane, in the thickness direction." Thus, the antioxidant may be contained in the electrolyte membrane in an amount ranging from about 0.1 µm/cm$^2$ to about 20 µm/cm$^2$. The amount of the antioxidant contained in the electrolyte membrane may be varied according to a driving time. Preferably, since a dissolution rate is varied according to an initial content, the amount of the antioxidant may be an amount of antioxidant in the antioxidant precursor contained in the gas diffusion layer and may be varied according to a specific surface area of antioxidant oxide contained in the gas diffusion layer.

Thus, the fuel cell according to the present invention may minimize an ohmic loss even when the antioxidant is used with a low volume and at high efficiency so that performance of the fuel cell may be efficiently improved and, simultaneously, there is an advantage which is capable of overcoming a lack of mass production due to occurrence of a step when the existing transfer process is applied.

EXAMPLE

Hereinafter, the present invention will be described in more detail through specific examples. The following examples are merely illustrative to aid understanding of the present invention, and the scope of the present invention is not limited by the following examples.

Examples 1-1 to 1-5

Manufacturing of a Fuel Cell Satisfying Current and Other Conditions (S10): an ionomer of an equivalent weight 735 (W. L. Gore & Associates GmbH) was prepared as the electrolyte membrane. In addition, an electrode having a thickness ranging from 7 µm to 8 µm and containing a Pt/C catalyst, the ionomer, and an antioxidant $Ce(NO_3)_3.6H_2O$ was prepared as the cathode, an electrode having a thickness ranging 1 µm to 2 µm and containing the Pt/C catalyst, $IrO_2$, the ionomer, and an antioxidant $Ce(NO_3)_3.6H_2O$ was prepared as the anode, and the cathode and the anode were provided on one surface and the other surface of the electrolyte membrane so that the three-layer MEA was prepared. Then, the sub-gasket equipped with the air inlet and the hydrogen inlet was provided on an edge region of the side surface of the three-layer MEA to seal a side end portion of the three-layer MEA.

(S20): The five-layer MEA was prepared by stacking the gas diffusion layer containing $CeO_2$ on the cathode and the anode.

Specifically, a base material of 70 µm, which includes carbon nanofibers, was prepared. In addition, the gas diffusion layer was prepared by preparing the microporous layer of 20 µm, which is located on the base material and includes $CeO_2$. Then, the prepared gas diffusion layer was provided to be located on each of the cathode and the anode to manufacture the five-layer MEA. In this case, an antioxidant precursor including $CeO_2$ was included in the microporous layer in an amount of 165 µg/cm$^2$.

(S30): A constant current was applied to the five-layer MEA with an intensity of 130 A at an atmospheric pressure for 200 hours. In this case, a temperature was maintained at a temperature of 65° C. and humidity was maintained at 50%, and finally, fuel cells according to Examples 1-1 to 1-5 were manufactured.

Comparative Examples 1-1 and 1-2

Manufacturing of a General Fuel Cell without Current and Other Conditions

A fuel cell in which a bus electrode was applied to an M735 electrolyte membrane of G company was used as Comparative Example 1-1. A fuel cell in which an FE electrode was applied to an M770 electrolyte membrane of G company was used as Comparative Example 1-2. Comparative Examples 2-1 to 2-3: Manufacturing of a fuel cell which is out of a current and other conditions When compared with Examples 1-1 to 1-5, a constant current was applied with an intensity of zero A at pressurization of 30 kPa. In this case, except for a temperature being maintained at 65° C. and humidity being maintained at 50%, fuel cells were manufactured in the same manner as in Examples 1-1 to 1-5.

Comparative Examples 3-1 to 3-3

Manufacturing of a Fuel Cell Which is Out of a Current Holding Time Condition

When compared with Examples 1-1 to 1-5, except for a time in which a constant current was applied being less than three hours (2.5 hours), fuel cells were manufactured as in Examples 1-1 to 1-5.

Comparative Examples 4-1 to 4-5

Manufacturing of a Ready-Made Fuel Cell

A three-layer MEA was manufactured by placing the cathode and anode electrodes on both surfaces of the electrolyte membrane and performing a heat fusing transfer process. Thereafter, a five-layer MEA was manufactured by bonding a sub-gasket, which was coated with a polyurethane-based adhesive, to both surfaces of the three-layer MEA according to a reaction area of 270 cm². Heat treatment was performed through a hot press, and a fuel cell was prepared by punching a manifold suitable for a structure and an area of a separator.

Experimental Example 1

Analysis of Distribution of Metal Ions in Fuel Cell Manufactured According to the Present Invention The fuel cells were manufactured according to Example 1-1 and Comparative Examples 1-1 to 3-3, and a distribution of metal ions was compared according to a cross section of the MEA and a plane of the electrolyte membrane.

Figure 4A:
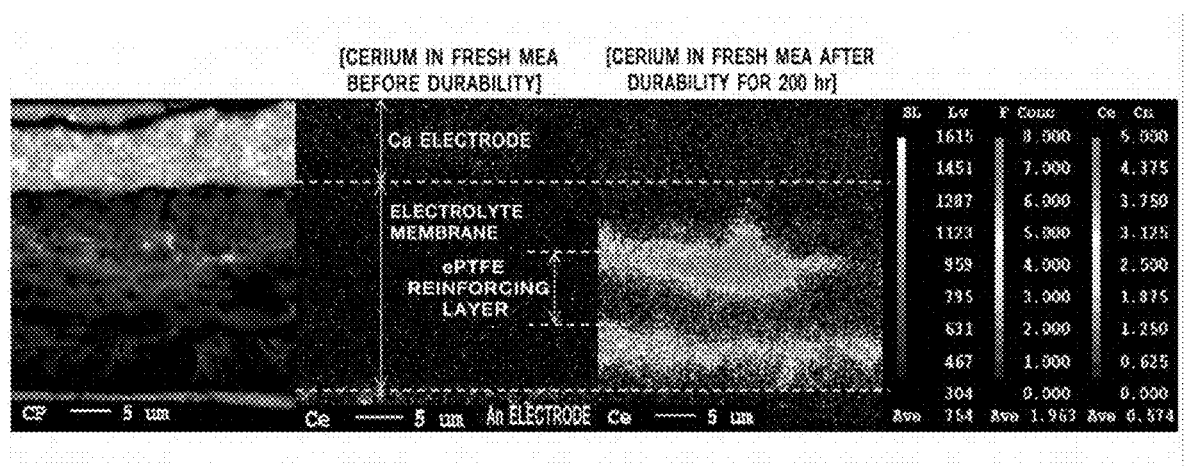
FIG. 4A is a mapping image illustrating a distribution of cerium ions before and after durability of an exemplary MEA in a fuel cell manufactured according to an exemplary embodiment of the present invention.

As shown in FIG. 4A, it was confirmed that metal ions which are antioxidants, that is, cerium ions, were hardly distributed in the electrolyte membrane before the current satisfying the condition of the present invention was applied. It also can be confirmed that a large amount of the cerium ions were distributed around a reinforcing layer in the electrolyte membrane after the current satisfying the condition of the present invention was applied.

Figure 4B:
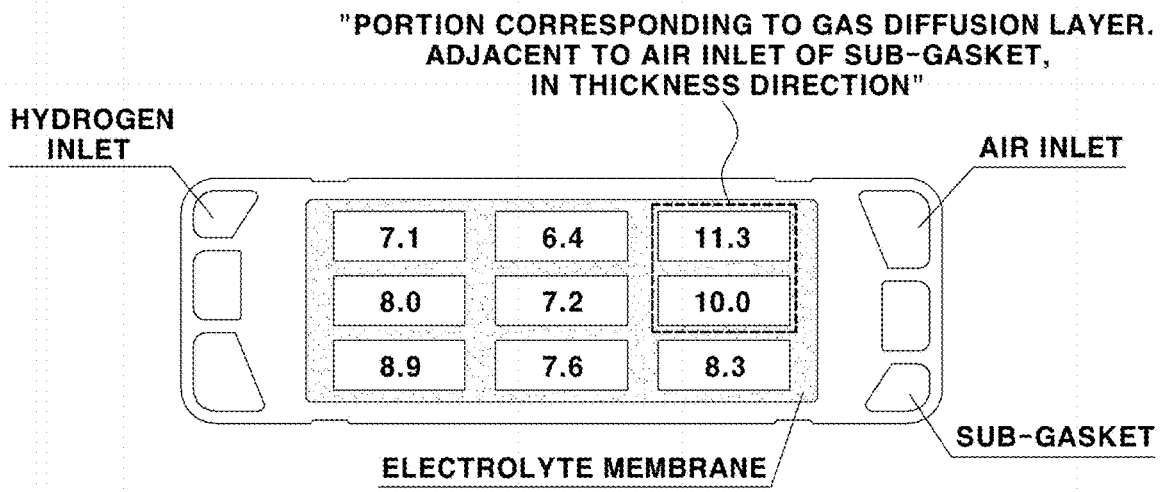
FIG. 4B is a plan view illustrating a distribution of cerium ions in a plane of an exemplary electrolyte membrane after a current satisfying a condition of the present invention is applied to the fuel cell manufactured according to an exemplary embodiment of the present invention.
Figure 4C:
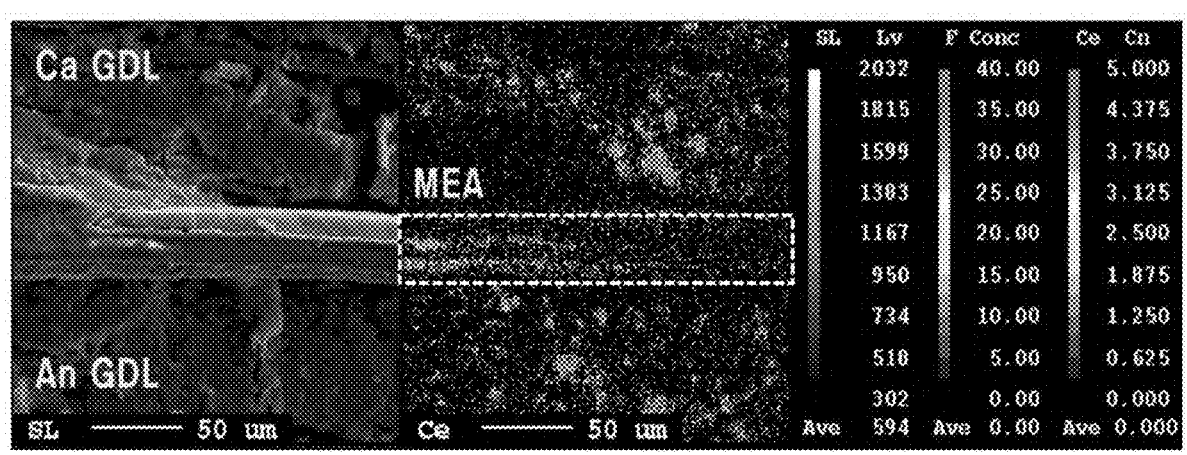
FIG. 4C is a mapping image illustrating a distribution of cerium ions through a cross section of an exemplary electrolyte membrane after the current satisfying the condition of the present invention is applied to the fuel cell manufactured according to an exemplary embodiment of the present invention.

Meanwhile, FIG. 4B shows the distribution of the cerium ions in the plane of the electrolyte membrane after the current satisfying the condition of the present invention was applied. As shown in FIG. 4B, it can be confirmed that the metal ions above an average were distributed in the "portion corresponding to the gas diffusion layer adjacent to the air inlet of the sub-gasket, which was the position in which degradation occurred frequently, in the thickness direction," in the electrolyte membrane in the MEA manufactured according to the present invention. In addition, FIG. 4C illustrates a cross section of the MEA of the air inlet as a mapping image. As shown in FIG. 4C, it can be confirmed that the metal ions, which were antioxidants were distributed in the "portion corresponding to the gas diffusion layer adjacent to the air inlet of the sub-gasket, which was the position in which degradation occurred frequently, in the thickness direction," specificity, in the electrolyte membrane.

Figure 5A:
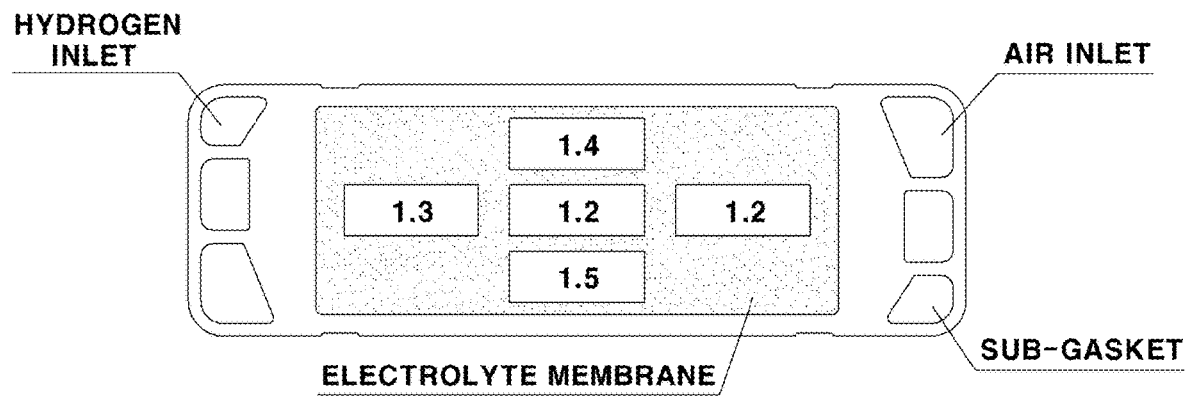
FIGS. 5A and 5B show distributions of cerium ions in planes of electrolyte membranes in fuel cells according to Comparative Examples 1-1 and 1-2.
Figure 5B:
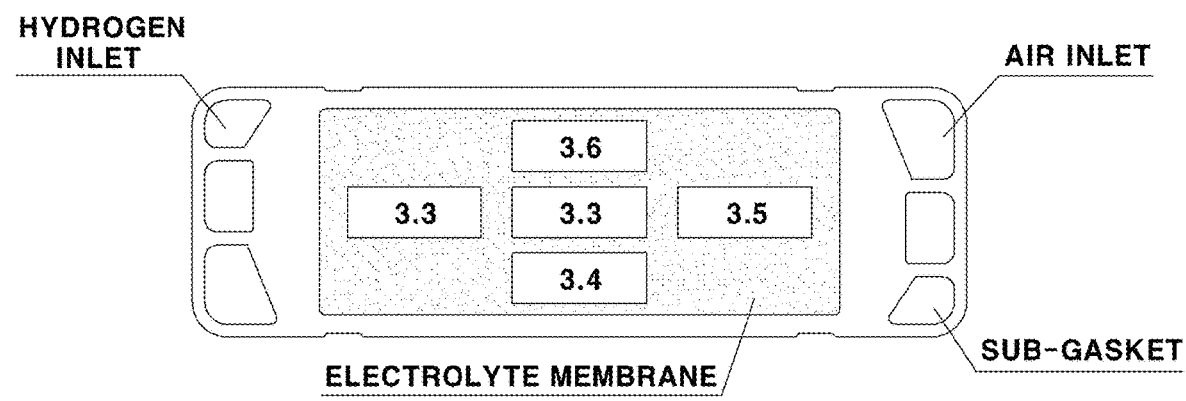
Figure 6A:
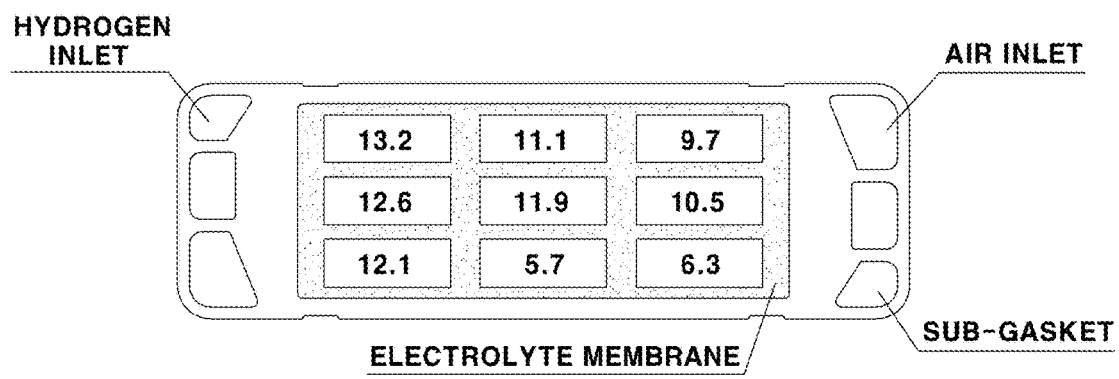
FIGS. 6A to 6C show distributions of cerium ions in planes of electrolyte membranes in fuel cells according to Comparative Examples 2-1 to 2-3.
Figure 6B:
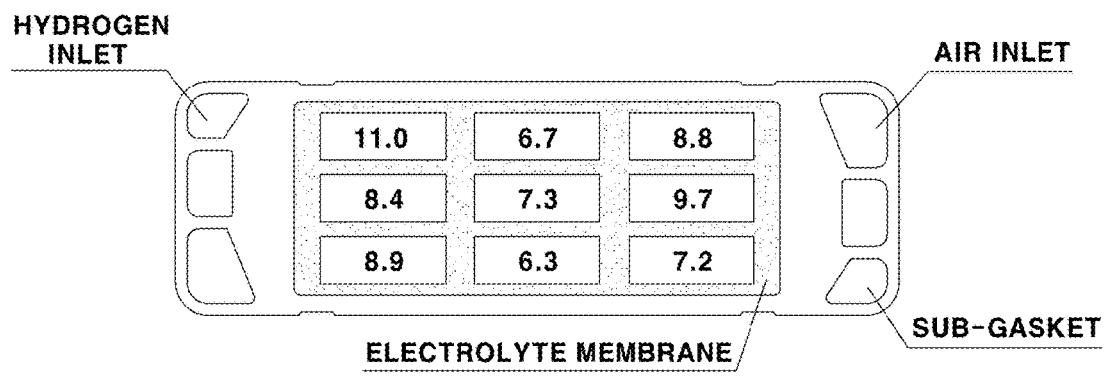
Figure 6C:
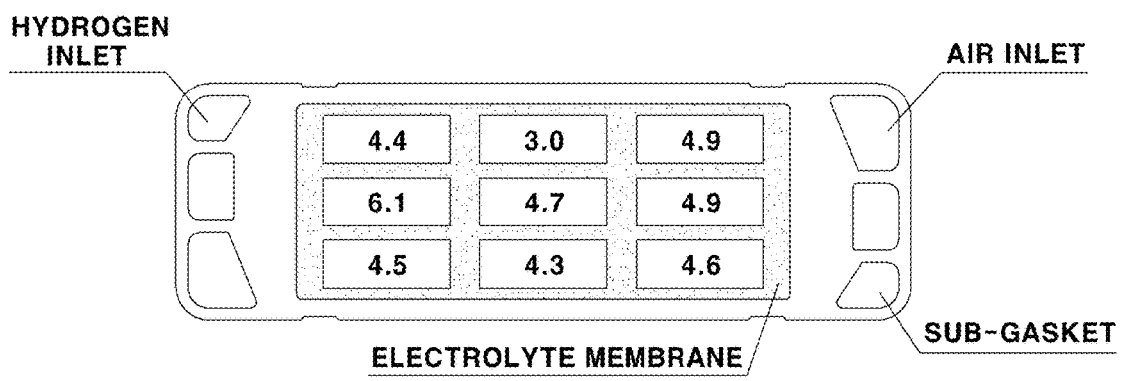
Figure 7A:
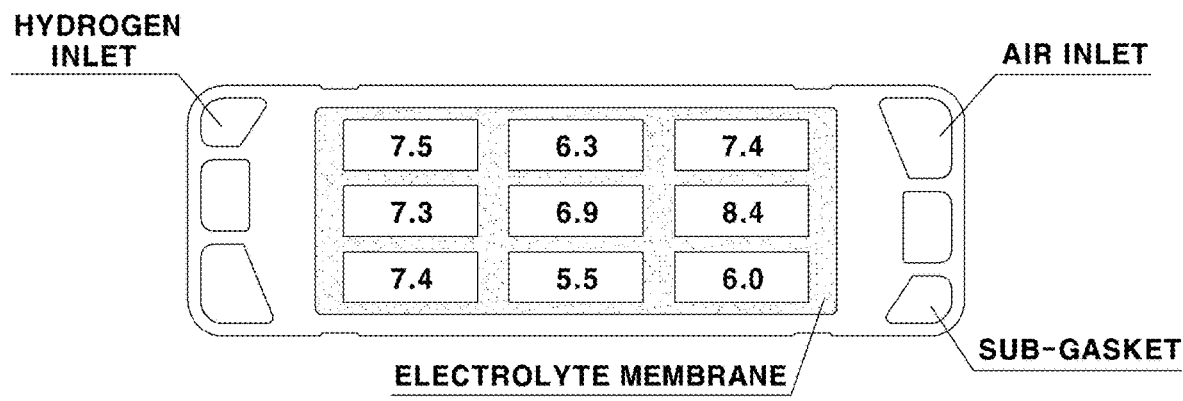
FIGS. 7A to 7C show the distributions of cerium ions in the planes of the electrolyte membranes in the fuel cells according to Comparative Examples 2-1 to 2-3.
Figure 7B:
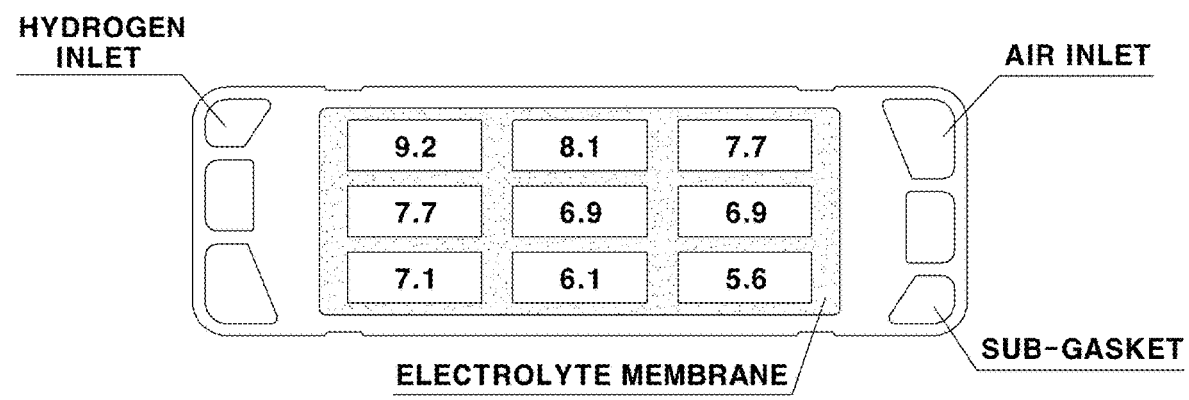
Figure 7C:
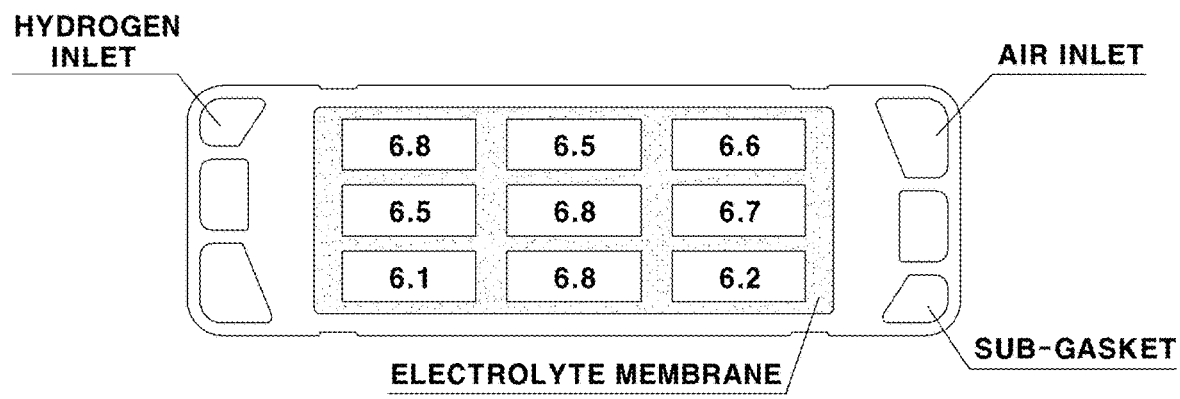

Meanwhile, FIGS. 5A and 5B show distributions of the cerium ions in planes of the electrolyte membranes in the MEAs according to Comparative Examples 1-1 and 1-2. As shown in FIGS. 5A and 5B, it can be confirmed that, in the case of the plane of the electrolyte membrane to which the current satisfying the condition of the present invention was not applied, the metal ions were uniformly distributed without any deviation for each position. In addition, FIGS. 6A to 6C show distributions of the cerium ions in planes of the electrolyte membrane in the MEA according to Comparative Examples 2-1 to 2-3. As shown in FIGS. 6A to 6C, it can be confirmed that, in the case of the plane of the electrolyte membranes to which the current out of the condition of the present invention was applied, the metal ions were not specifically distributed in the "portion corresponding to the gas diffusion layer adjacent to the air inlet of the sub-gasket, which was a position in which a degradation rate was high, in the thickness direction," and the metal ions were heavily distributed in the "portion corresponding to the gas diffusion layer adjacent to the air inlet of the sub-gasket, which was irrespective of the degradation rate, in the thickness direction" so that it was difficult to perform position control. In addition, FIGS. 7A to 7C show distributions of the cerium ions in planes of the electrolyte membranes in the MEAs according to Comparative Examples 3-1 to 3-3. As shown ins FIGS. 7A to 7C, it can be confirmed that, in the case of the plane of the electrolyte membrane to which the current was applied for an insufficient current holding time among the conditions of the present invention, the cerium ions were not sufficiently moved into the electrolyte membrane and a movement deviation was not exhibited in a plane direction.

Therefore, according to various exemplary embodiments of the present invention, in the method of manufacturing a fuel celln, since an additional operation is not required in the manufacturing operation so as to control a position of the antioxidant, efficiency of the process may be improved. In addition, when compared to the conventional method of applying or distributing the antioxidant onto an entire surface at a high concentration, the method of manufacturing a fuel cell according to various exemplary embodiments of the present invention may selectively and intensively put the antioxidant at a high concentration into only a position at which degradation occurs frequently in the electrolyte membrane according to an operating mode so that there is an advantage in that economic feasibility is excellent due to reduction in production cost. In addition, the greatest advantage is that the position control is possible in an ionic state instead of a cerium oxide type, so unlike a low distribution force in an oxide-type antioxidant, since the precursor itself has a structure that is easily hydrated as an oxide, there is an advantage in that distribution power is strong. Meanwhile, the fuel cell manufactured according to the various exemplary embodiments of the invention and the methods described herein may minimize an ohmic loss even when the antioxidant is used with a low volume and at high efficiency so that performance of the MEA may be efficiently improved and, simultaneously, there is an advantage which is capable of overcoming a lack of mass production due to occurrence of a step when the existing transfer process is applied.

Experimental Example 2

Figure 8A:
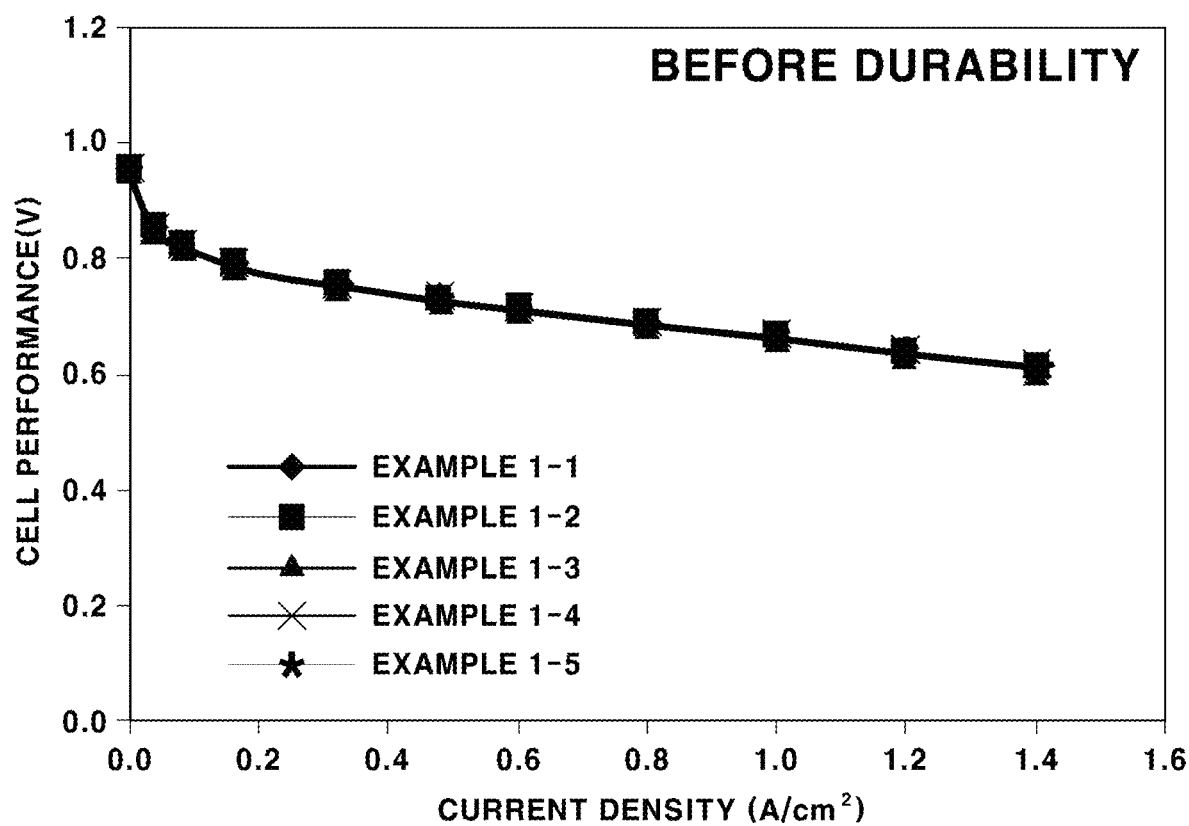
FIG. 8A is a graph showing cell performance before durability of fuel cells according to Examples 1-1 to 1-5.
Figure 8B:
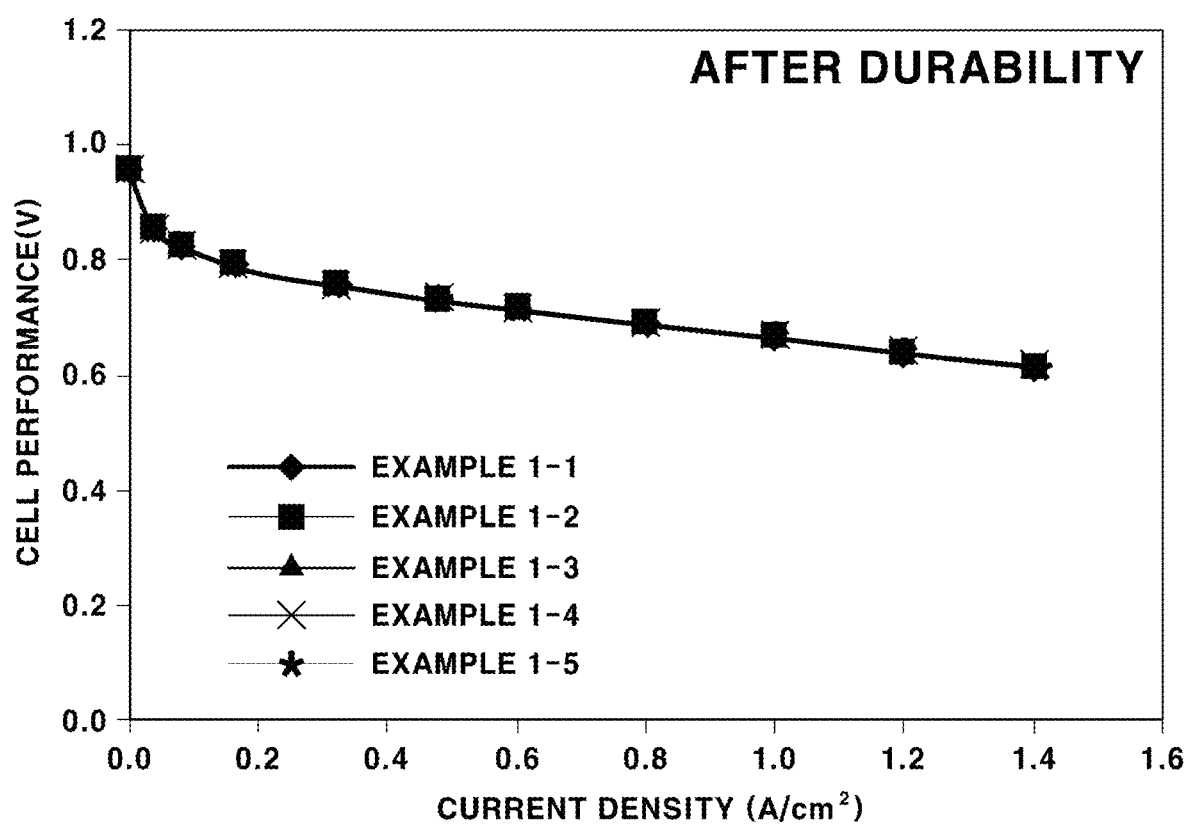
FIG. 8B is a graph showing cell performance after durability of the fuel cells according to Examples 1-1 to 1-5.
Figure 8C:
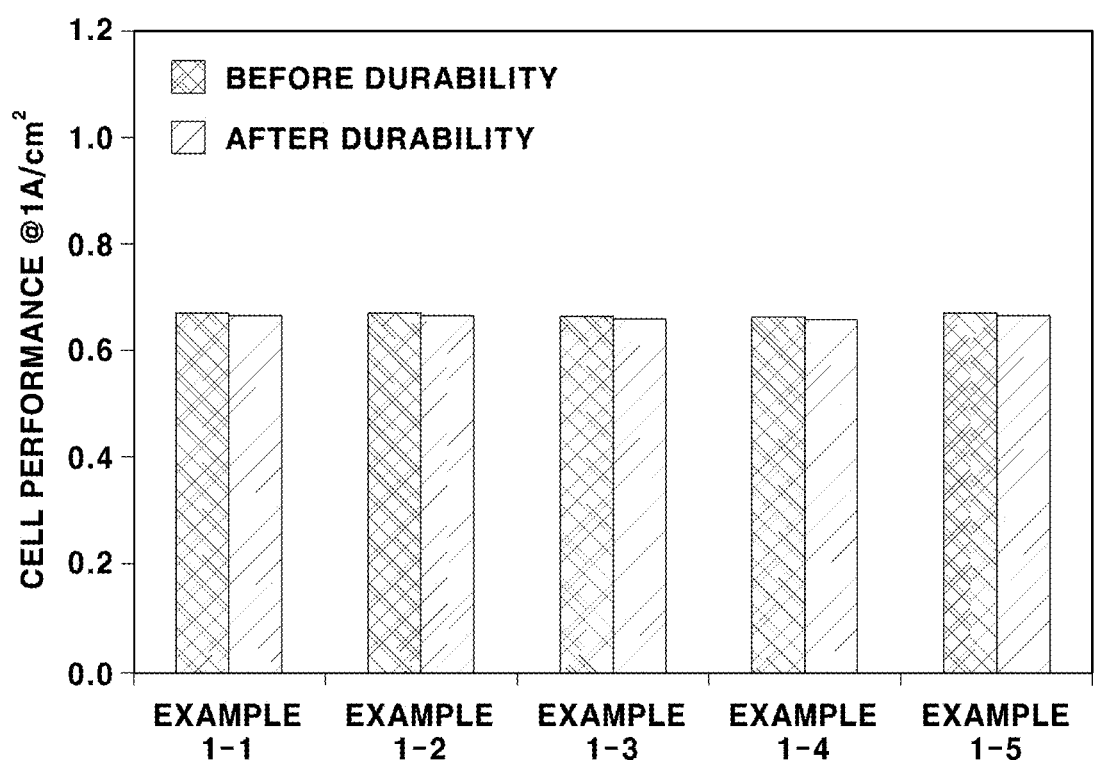
FIG. 8C is a bar graph showing a comparison of the cell performances before and after durability of the fuel cells according to Examples 1-1 to 1-5.

Confirmation of Durability of Fuel Cell Manufactured According to the Present Invention Fuel cells were manufactured according to Examples 1-1 to 1-5 of the present invention and Comparative Examples 4-1 to 4-5, cell performance of each of the fuel cells was evaluated, and the results thereof were shown in FIGS. 8A to 8C and the following table 1.

TABLE 1

| Items | | | 1 | 2 | 3 | 4 | 5 | Average |
|---|---|---|---|---|---|---|---|---|
| Cell performance @ 1 A/cm² (V) | Example | Before durability | 0.672 | 0.67 | 0.667 | 0.668 | 0.67 | 0.669 |
| | | After durability | 0.668 | 0.664 | 0.663 | 0.662 | 0.665 | 0.664 |
| | Compar- | Before | 0.676 | 0.679 | 0.678 | 0.663 | 0.662 | 0.671 |

TABLE 1-continued

| Items | | | 1 | 2 | 3 | 4 | 5 | Average |
|---|---|---|---|---|---|---|---|---|
| | ative Example | durability After durability | 0.657 | 0.649 | 0.646 | 0.648 | 0.648 | 0.65 |
| Performance Reduction rate (%) | Example | | −0.59(▼) | −0.89(▼) | −0.59(▼) | −0.74(▼) | −0.74(▼) | −0.74(▼) |
| | Comparative Example | | −2.80(▼) | −4.40(▼) | −4.71(▼) | −2.26(▼) | −2.11(▼) | −3.13(▼) |

Table 1 shows a reduction rate (%) in performance before and after durability. As shown in FIGS. 8A to 8C and Table 1 above, it can be confirmed that the MEA manufactured according to the present invention had a reduction rate in performance that was less than reduction rates of Comparative Examples 4-1 to 4-5, and thus the durability thereof was increased and improved.

Experimental Example 3

Analysis of Antioxidant Movement According to Current Holding Time of Fuel Cell Manufactured by the Methods The fuel cell was manufactured according to Example 1-1, and as the current holding time was gradually increased, a movement amount of the cerium ions, which were antioxidants, moved to the electrolyte membrane in the fuel cell was analyzed, and the results thereof were shown in Table 2 below and FIG. 9.

TABLE 2

| Current holding time (hr) | Measured amount of cerium ions Fresh ($\mu$m/cm$^2$) | Measured amount of cerium ions After durability ($\mu$m/cm$^2$) | Measured amount of cerium ions Increase or decrease ($\mu$m/cm$^2$) |
|---|---|---|---|
| 3 (activation) | 1.3 | 2.6 | 2.0 times increase |
| 200 | | 8.3 | 6.4 times increase |
| 400 | | 9.5 | 7.3 times increase |
| 800 | | 10.0 | 7.7 times increase |

Figure 9:
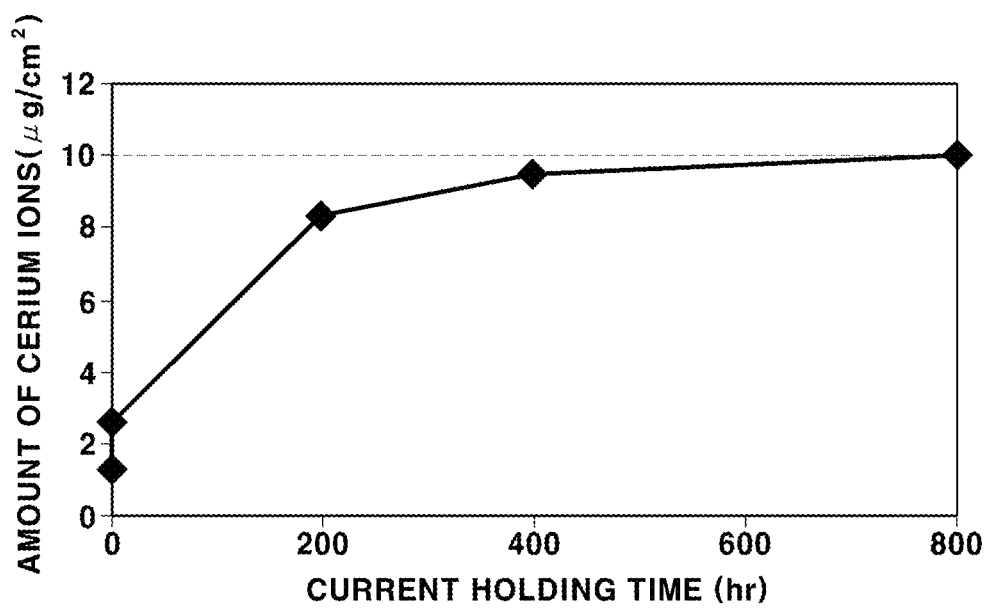
FIG. 9 is a graph showing analysis of an amount of cerium ions, which are antioxidants, according to a current holding time of the fuel cell according to Example 1-1.

As shown in Table 2 above and FIG. 9, it can be confirmed that the amount of the cerium ions in the electrolyte membrane was included as 1.3 $\mu$m/cm$^2$ after a time in which the current was applied to the fuel cell according to Example 1-1 exceeded three hours, and as the current holding time was increased, the amount of the cerium ions moved to the electrolyte membrane was gradually increased. It can be confirmed that, after 400 hours, the increase in the amount of the cerium ions was gradually decreased, and after 800 hours, the amount of the cerium ions reached a saturation state in which the amount of the cerium ions was not increased to a certain level (10 $\mu$g/cm$^2$) or more so that there was almost no increase. In addition, in the fuel cell according to the present invention, it can be confirmed that the current may be preferably applied in a condition in which a temperature ranges from 30° C. to 90° C., humidity ranges from 30% to 100%, and a time for applying the current is three hours or longer, and more preferably, when the current was applied in a condition in which a temperature ranges from 55° C. to 65° C., humidity ranges from 50% to 100%, and a time ranges from three hours to 800 hours, the antioxidants may be moved to the electrolyte membrane in a most efficient and economical manner.

According to various exemplary embodiments of the present invention, the method of manufacturing an MEA for a fuel cell may selectively and intensively put the antioxidant at a high concentration in only a position at which degradation occurs frequently in the electrolyte membrane according to an operation mode so that there is an advantage in that economic feasibility is excellent due to reduction in production cost and durability of the electrolyte membrane may be increased and improved.

According to various exemplary embodiments of the present invention, since an additional operation is not required in a manufacturing operation so as to control a position of the antioxidant, efficiency of a process can be improved. In addition, when compared to the conventional method of applying or distributing the antioxidant onto an entire surface at a high concentration, the method of manufacturing a fuel cell according to the present invention can selectively and intensively put an antioxidant at a high concentration into only a position at which degradation occurs frequently in the electrolyte membrane according to an operating mode so that there is an advantage economic feasibility is excellent due to reduction in production cost. In addition, the greatest advantage may be that the position control is possible in an ionic state instead of a cerium oxide type, so unlike a low distribution force in an oxide-type antioxidant, since the precursor itself has a structure that is easily hydrated as an oxide, there is an advantage in that distribution force is strong. Meanwhile, a membrane-electrode assembly (MEA) for the fuel cell manufactured according to various exemplary embodiments of the present invention can minimize an ohmic loss even when the antioxidant is used with a low volume and at high efficiency so that performance of the MEA can be efficiently improved, and, simultaneously, there is an advantage which is capable of overcoming a lack of mass production due to occurrence of a step when the existing transfer process is applied.

The effects of the present invention are not limited to the above-described effects. It should be understood that the effects of the present invention include all effects which can be inferred from the above description.

What is claimed is:

1. A method of manufacturing a fuel cell, comprising:
    bonding a sub-gasket, provided with an air inlet and a hydrogen inlet, to a side surface of a three-layer membrane-electrode assembly (MEA) including an electrolyte membrane, a cathode located on one surface of the electrolyte membrane, and an anode located on the other surface of the electrolyte membrane;
    stacking a gas diffusion layer on the cathode and the anode of the three-layer membrane-electrode assembly to obtain a five-layer MEA, wherein at least one of the gas diffusion layers comprises an antioxidant precursor;
    and applying a current to the five-layer MEA and moving an antioxidant, which is derived from the antioxidant precursor, to the electrolyte membrane.

2. The method of claim 1, wherein:
the gas diffusion layer comprises a base material, and a microporous layer located on the base material;
the microporous layer is located on the three-layer membrane-electrode assembly; and
at least one of the microporous layers comprises the antioxidant precursor.

3. The method of claim 2, wherein the microporous layer comprises the antioxidant precursor in a content ranging from 165 μg/cm$^2$ to 210 μg/cm$^2$.

4. The method of claim 2, wherein a thickness of the microporous layer ranges from 10 μm to 100 μm.

5. The method of claim 1, wherein the antioxidant precursor comprises an oxide of the antioxidant.

6. The method of claim 5, wherein the antioxidant precursor comprises at least one of $CeO_2$ and $MgO_2$.

7. The method of claim 1, wherein the antioxidant is in an ionic state.

8. The method of claim 7, wherein the antioxidant comprises one or more selected from the group consisting of $Ce^{3+}$, $Ce^{4+}$, $Mg^{2+}$, and $Mg^{3+}$.

9. The method of claim 1, wherein the current is applied to the gas diffusion layer with an intensity ranging from 50 A to 250 A.

10. The method of claim 1, wherein the current is applied to the gas diffusion layer in a condition in which a temperature ranges from 30° C. to 90° C., humidity ranges from 30% to 100%, and a time for applying the current is three hours or greater.

* * * * *